United States Patent [19]
McCutcheon et al.

[11] Patent Number: 5,338,006
[45] Date of Patent: Aug. 16, 1994

[54] GATE VALVE WITH IMPROVED SEAL UNIT

[75] Inventors: Andrew J. McCutcheon, Camas, Wash.; Jeffrey M. Bowman, Portland, Oreg.; David L. Gambetta, Vancouver, Wash.

[73] Assignee: Technaflow, Inc., Vancouver, Wash.

[21] Appl. No.: 123,421

[22] Filed: Sep. 16, 1993

[51] Int. Cl.$^5$ ............................................. F16K 3/00
[52] U.S. Cl. ................................. 251/327; 251/328; 251/358
[58] Field of Search ................ 251/327, 328, 358, 362

[56] References Cited
U.S. PATENT DOCUMENTS

| | | | |
|---|---|---|---|
| 2,626,776 | 1/1953 | Martineau | 251/167 |
| 2,985,422 | 5/1961 | Anderson et al. | 251/172 |
| 3,333,816 | 8/1967 | Williams et al. | 251/327 |
| 3,722,857 | 3/1973 | Townsend | 251/203 |
| 4,515,347 | 5/1985 | Sitton et al. | 251/328 |
| 4,688,597 | 8/1987 | Clarkson et al. | 251/327 X |
| 4,773,627 | 9/1988 | King et al. | 251/328 |
| 4,846,442 | 7/1989 | Clarkson et al. | 251/328 |
| 4,911,407 | 3/1990 | Paul, Jr. | 251/172 |

OTHER PUBLICATIONS

Bulletin 27-25, "KGD Model Wafer-Type Knife-Gate Valves," The Clarkson Company, Sep. 1991.
Lit. No. 27-70, "Installation and Maintenance Instructions, Clarkson Series KGD Valve," The Clarkson Company, Jun. 1992.

*Primary Examiner*—John C. Fox
*Attorney, Agent, or Firm*—Stoel Rives Boley Jones & Grey

[57] ABSTRACT

A gate valve sealing unit includes first and second annular seal members that are attached to a main body structure within a passageway that receives and is selectively occluded by a gate. The first and second seal members include first and second rigid mounting hubs to which are mounted first and second annular elastomer sleeves, respectively. Each elastomer sleeve has a continuous lip section and plural axially spaced cavities, the lip sections of the first and second sleeves engaging peripheral margins on opposite sides of the gate when it occludes the passageway and engaging each other otherwise. The first and second mounting hubs include axially outward radial flanges that extend from the respective first and second sides of the main body structure.

24 Claims, 4 Drawing Sheets

GATE VALVE WITH IMPROVED SEAL UNIT

TECHNICAL FIELD

The present invention relates to gate valves having a main body structure with a passageway that is selectively occluded by a gate and, in particular, to providing a seal between the main body structure and the gate.

BACKGROUND OF THE INVENTION

Gate valves are used to control the flow of various fluids carried inside tubular conduits or pipes. A gate valve typically includes a main body structure with a passageway positioned between and coupling a pair of axially-aligned conduits that are bolted to opposite sides of the main body structure. A flat, fluid-impermeable gate with a pair of opposed, substantially planar faces is slidable into the passageway through a slot in the main body structure to selectively occlude the passageway and thereby close the valve.

Gate valves that are used to control the flow of fluids include a seal between the gate and the main body structure to prevent the fluid from leaking, either from the valve or across it when closed. For fluids that include a mixture of solids, referred to as a slurry, an adequate seal between the gate and the main body structure can be difficult to achieve. Slurries arise in many harsh industrial environments, such as wood pulp processing and paper manufacturing, various types of mining including coal and phosphates, and bottom ash removal systems for power station smokestack scrubbers. The solids in such slurries can clog, coat, or damage a seal in many gate valves and thereby allow the fluid to leak.

One bidirectional gate valve seal, described in U.S. Pat. No. 4,846,442 of Clarkson et al., includes a pair of opposed solid resilient sleeve units that compressibly engage each other when the valve is open and engage opposite sides of the gate when the valve is closed. A stiffening ring bonded to each sleeve unit engages a rigid locking ring to hold the sleeve unit in place.

Such a gate valve seal suffers from several disadvantages. The solid resilient sleeve units can be difficult to displace when closing the valve because the design does not include a way to eliminate overcompression of the sleeve from the flange-raised face surfaces of the mating conduit, thereby making the valve difficult to operate. Moreover, pressure against the gate in a valve closed position can displace the resilient sleeve unit on the downstream side and allow a leak between the gate and the upstream resilient sleeve unit.

SUMMARY OF THE INVENTION

An object of the present invention is, therefore, to provide a bidirectional gate valve with an improved seal unit.

Another object of this invention is to provide such a gate valve in which the seal unit allows easy operation of the valve.

A further object of this invention is to provide such a gate valve in which the seal unit prevents the valve from leaking, when fully open or fully closed and under pressure.

The present invention includes a gate valve having a main body structure to which respective first and second axially aligned conduits are attachable, and an opening that defines a passageway between the conduits. A gate is positionable to occlude the passageway and extends from the main body structure in a direction that is transverse to the axis of the first and second conduits, the gate having opposing sides that each have a peripheral margin.

The valve includes a seal unit having first and second annular sealing members that are set within the main body structure to receive the peripheral margins of the gate when it occludes the passageway. The first and second sealing members include first and second rigid, annular mounting hubs to which respective first and second annular elastomer sleeves are mounted.

Each elastomer sleeve has a continuous major lip section and plural angularly-spaced cavities, the lip sections of the first and second sleeves engaging the peripheral margins of the gate when it occludes the passageway and engaging each other otherwise. The mounting hubs include radially outward flanges that extend axially outward from the main body structure. The mounting hub flanges engage the flanges of conduits coupled to the valve body to prevent overcompression and a consequent excessive wear of the elastomer sleeves, and to prevent difficult operation of the valve.

The mounting hubs also include facing edges that are spaced apart also to support the peripheral margins of the gate when it occludes the passageway and is under pressure, thereby preventing undercompression of the upstream sleeve and consequent leakage. The plural cavities facilitate displacement of the elastomer sleeves when they engage the gate, thereby allowing easy operation of the valve and enhancing durability of the elastomer sleeves.

Additional objects and advantages of the present invention will be apparent from the detailed description of a preferred embodiment thereof, which proceeds with reference to the accompanying drawings.

DETAILED DESCRIPTION OF A PREFERRED EMBODIMENT

Figure 1:
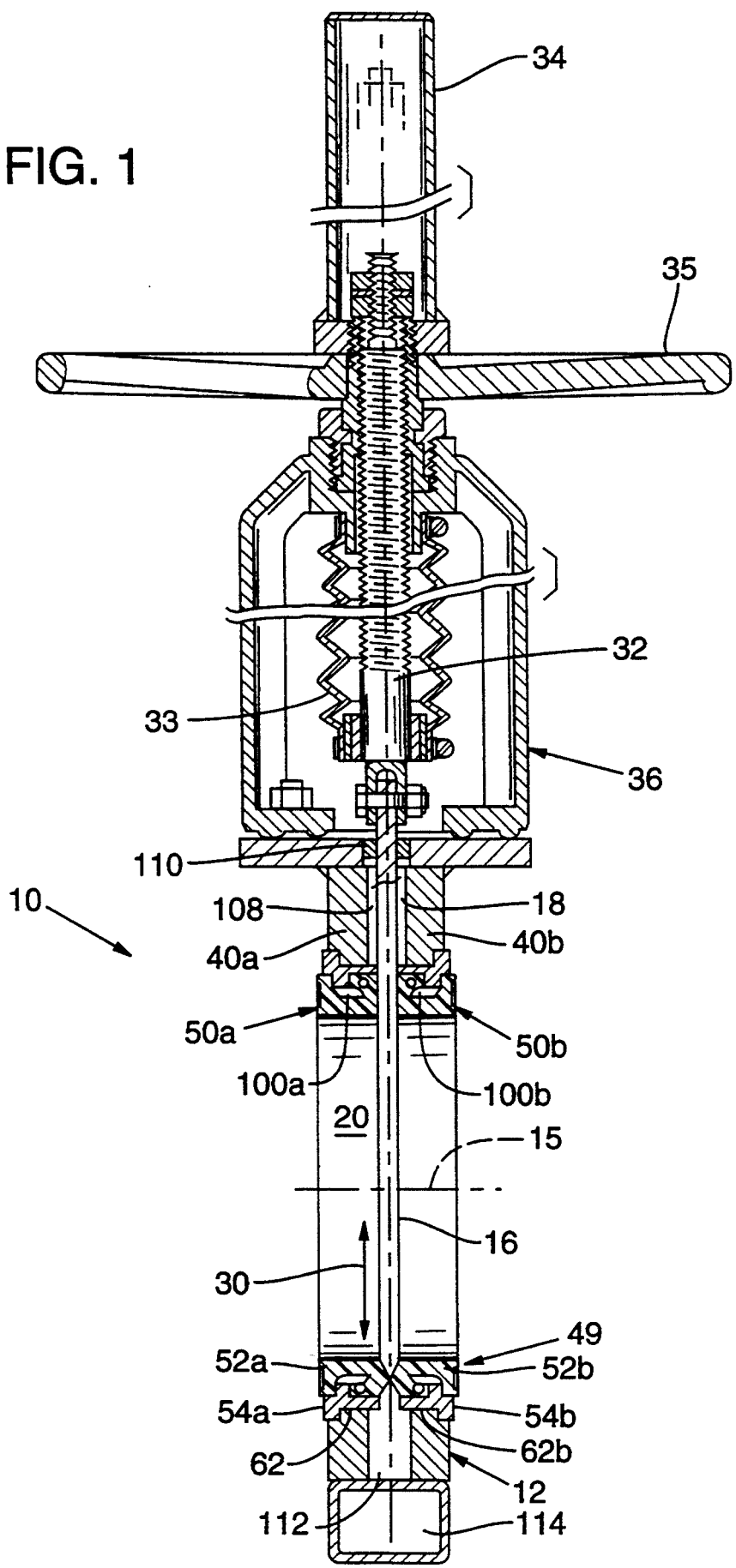
FIG. 1 is a fragmentary sectional side view of a gate valve employing a seal unit of the present invention.
Figure 2:
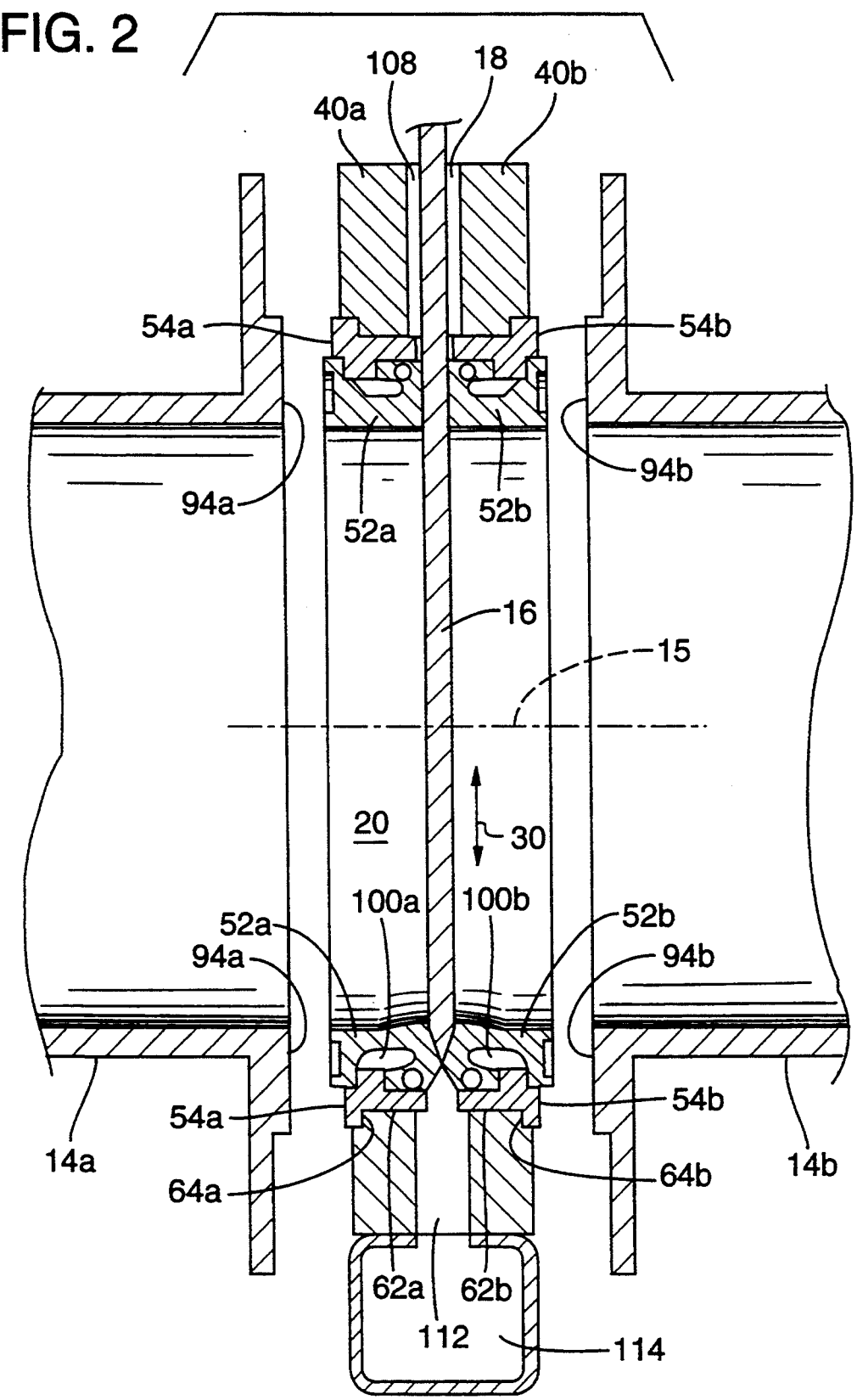
FIG. 2 is an enlarged partial side view of the seal unit of FIG. 1 positioned between a pair of conduits.
Figure 3:
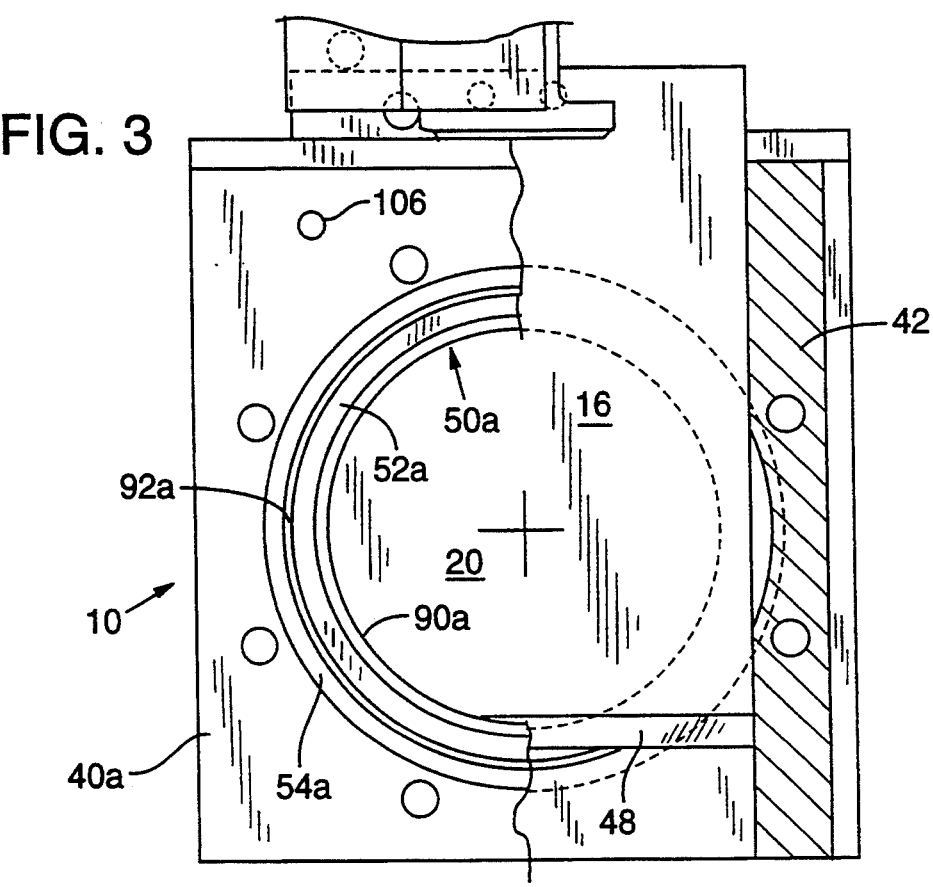
FIG. 3 is a partial front elevation showing a main body section and gate of the valve of FIG. 1.

With reference to FIGS. 1, 2, and 3, a bidirectional knife gate valve 10 having a main body structure 12 is positioned between a pair of axially aligned conduits 14a and 14b for carrying a fluid or slurry along an axis 15. A flat, fluid-impermeable gate 16 is positioned within a slot 18 passing through main body structure 12.

Gate 16 is slidable through slot 18 to selectively occlude an interior region or passageway 20 of valve 10. Passageway 20 extends between and couples conduits 14a and 14b. Occlusion of passageway 20 with gate 16 functions to close valve 10. Removing gate 16 from passageway 20 functions to open gate valve 10. Gate 16 is slidable through slot 18 in directions 30 that are transverse, preferably perpendicular, to axis 15.

Movement of gate 16 through slot 18 is controlled by a conventional threaded stem 32 positioned within an impermeable, resilient boot 33 and cap 34, and coupled to handwheel unit 35, which are secured to an upper portion 36 of main body structure 12. It will be appreciated that movement of gate 16 through slot 18 may be controlled by other conventional mechanisms such as, for example, pneumatic, hydraulic, or electromechanical mechanisms.

Main body structure 12 includes a pair of opposed, substantially identical body halves 40a and 40b that are welded or bolted together with a pair of flat spacers 42 (only one shown in FIG. 3) positioned between the sides thereof. Body halves 40a and 40b may be fabricated or cast metal, preferably steel, or any other suitable material including composites. Spacers 42 are formed of a rigid material, such as stainless steel or mild steel, that are selected according to the temperature and chemical characteristics of the slurry. Spacers 42 separate body halves 40a and 40b to form slot 18 through which gate 16 is movable to selectively open or close gate valve 10.

Figure 4A:
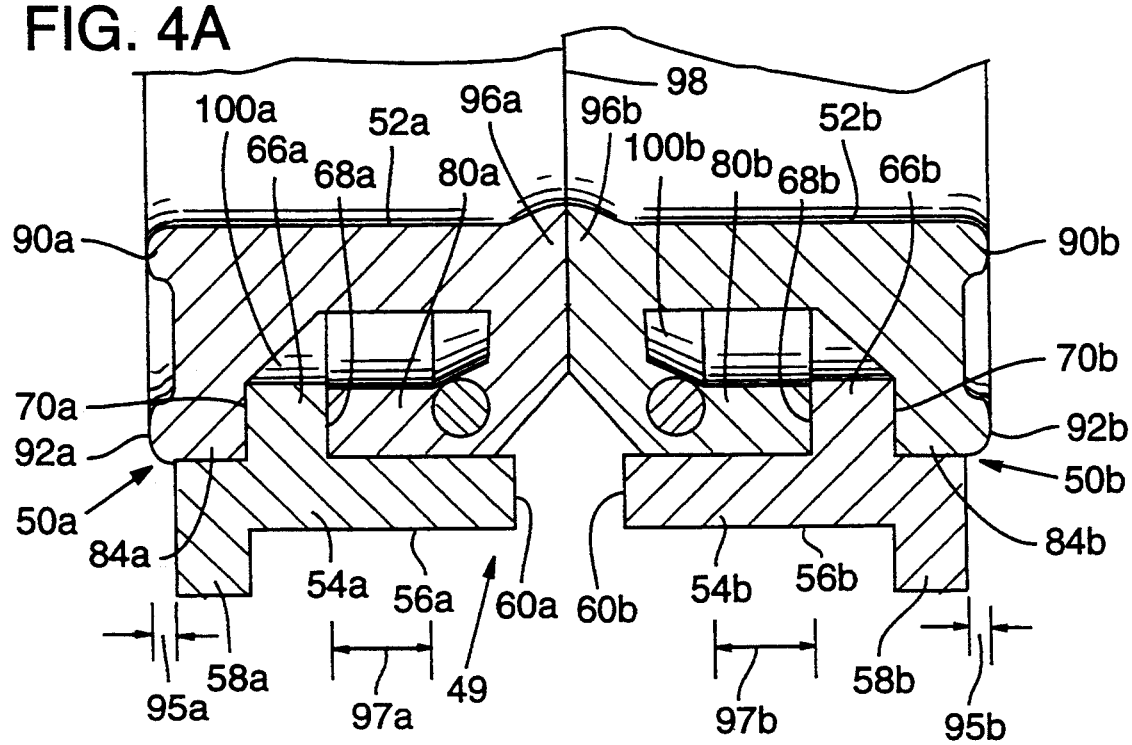
FIGS. 4A and 4B are enlarged partial sectional side views emphasizing the seal unit in the valve of FIG. 1 and showing the valve in its respective open and closed positions.
Figure 4B:
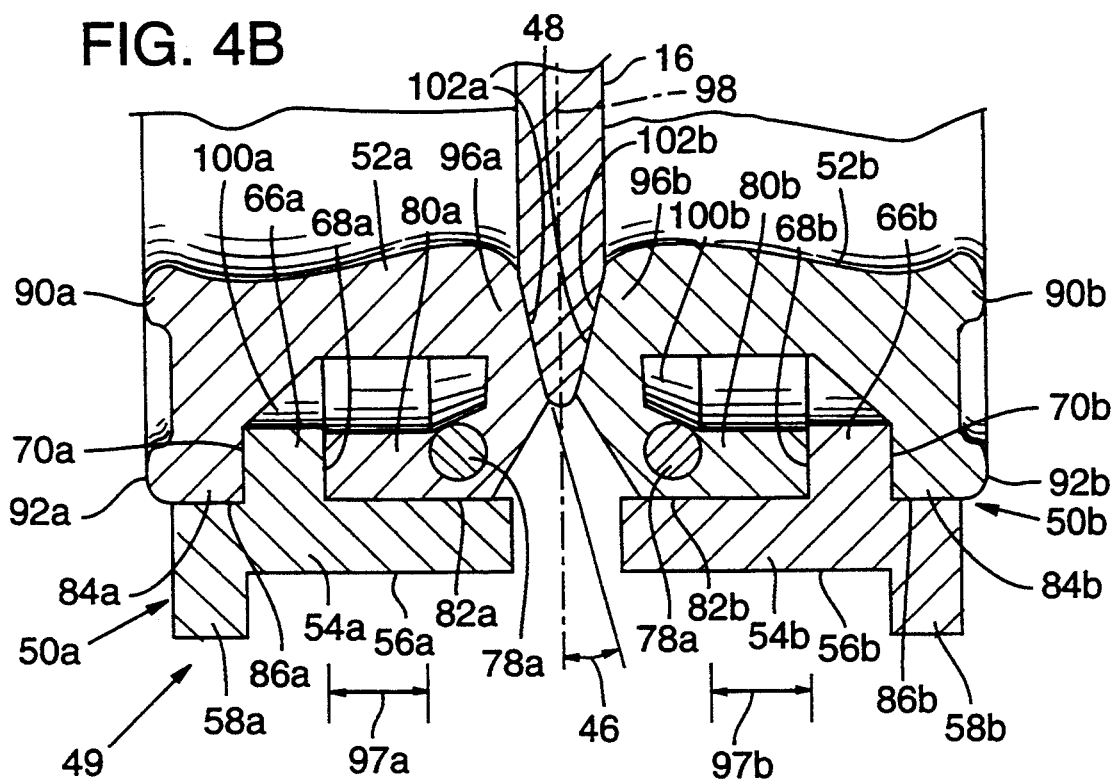

With reference also to FIGS. 4A and 4B, a seal unit 49 includes substantially similar seal members 50a and 50b positioned within respective body halves 40a and 40b and cooperating to seal gate valve 10 whether it is open or closed. Seal members 50a and 50b are positioned and sized to provide valve 10 with full flow bore when it is completely open. Seal members 50a and 50b have substantially similar components that are distinguished by the suffices "a" and "b". The following description is directed to seal member 50a, but is similarly applicable to seal member 50b.

Seal member 50a includes a resilient, annular, elastomer sleeve 52a and a substantially rigid annular hub 54a that are press fit together. Hub 54a includes a substantially flat circumferential surface 56a with a radially outward flange 58a positioned opposite an axially inward support face 60a. Surface 56a seats against an interior surface 62a of body half 40a; flange 58a seats in and projects from a recess 64a in an axially outer face of body half 40a; and support face 60a extends into slot 18. Elastomer sleeve 52a is preferably formed of a molded soft, resilient material such as natural rubber, chlorobutyl, or neoprene with additives such as wax or Teflon½ included to improve lubricity. Hub 54a is preferably formed of a rigid material of low compressibility such as polyamide, available as Nylatron GSM ™ from Polymer Corporation of Reading, Pa., ethylenechlorotrifluroethylene, available as Halar ™ from Ausimont of Morristown, N.J., or stainless steel of the types 304 or 316.

Gate 16 may be metal plate, plastic, or a composite material, with a taper 46 (FIG. 4B) of 7°–12°, preferably 10°, ground (i.e., for a metal plate) along both sides of leading edge 48. The angle of taper 46 on leading edge 48 of gate 16 is selected to be sufficiently large to prevent leading edge 48 from cutting elastomer sleeves 52a and 52b. The angle is sufficiently small to allow easy movement of gate 16 between sleeves 52a and 52b and to minimize leakage during movement of gate 16.

A radially inwardly projecting ridge 66a having opposed faces 68a and 70a is press fit into a radially inward recess 76a (FIG. 5) in elastomer sleeve 52a. A metal retaining ring 78a, is embedded in sleeve 52a in a rim segment 80a that engages face 68a and an adjacent axially inward ledge 82a of hub 54a. Retaining ring 78a is preferably of mild steel because of low cost and superior adhesion to sleeve 52a, but could alternatively be of stainless steel for use in a corrosive environment. A rim segment 84a of sleeve 52a engages face 70a and an adjacent axially outward ledge 86a of hub 54a. A pair of axially outwardly projecting annular ridges 90a and 92a function as a gasket for engaging a flange surface 94a of conduit 14a to hold sleeve 52a in place and provide a seal between conduit 14a and body half 40a. Preferably, ridges 90a and 92a project beyond flange 58a by a distance 95a (FIG. 4A), for example, of about ⅛ inch (3.2 mm) for an 8 inch (20 cm) valve 10 before coupling of conduit 14a, and flange 58a projects from axially outer face of body half 40a by a similar distance.

Rim segment 80a has a large thickness 97a that allows rim segment 80a to be compressed by relatively large amounts. As a result, sleeve 52a is comparatively pliable and capable of maintaining a good seal against gate 16, even along the lower portion of passageway 20 as gate 16 is moved. Sleeve 52a and hub 54a may, therefore, be formed with rotational symmetry so that seal member 50a can be installed more easily without regard to rotational orientation. In contrast, some gate valve seals with less pliability require a groove along the lower portion of the passageway to improve sealing capability. However, such seals must be installed with a rotationally specific orientation, thereby making installation relatively difficult.

The hardness of elastomer sleeve 52a is a parameter that may affect valve performance. A sleeve 52a of insufficient hardness may cause it to misalign at operating pressures and extrude out of valve body 12. It has been empirically determined that a sleeve 52a of excessive hardness may not seal against gate 16 and thus take a compression set that would result in seal failure. For a preferred 8 inch (20 cm) diameter passageway 20 of a valve 10, an elastomer sleeve 52a with a hardness of 67 +0/−2 Durometer performs correctly at design pressures. The proper hardness figure may be different for valves of different passageway diameters.

Figure 5:
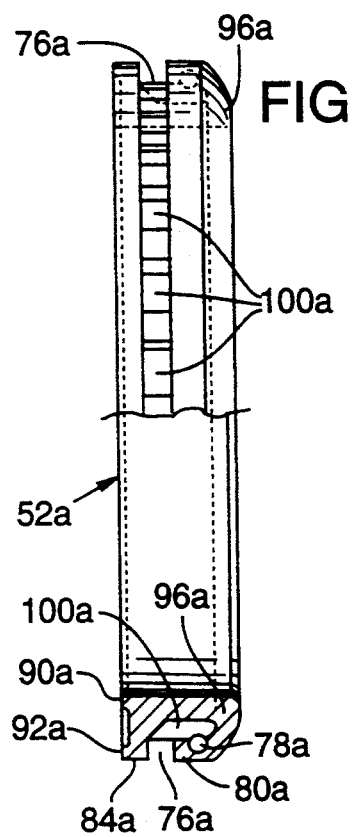
FIG. 5 is a partial sectional side elevation of an elastomer sleeve of the present invention.
Figure 6:
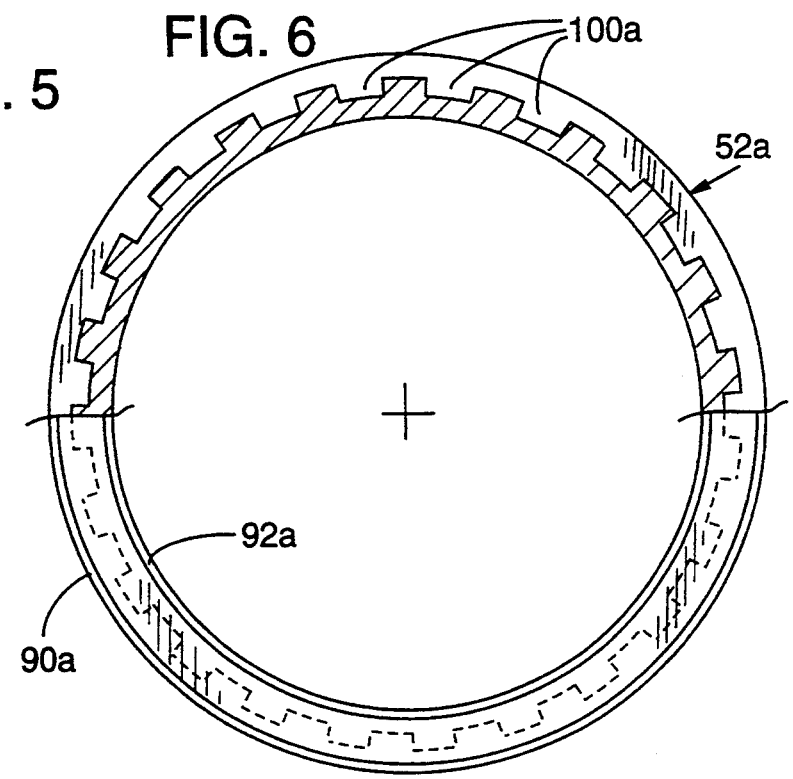
FIG. 6 is a partial sectional front elevation showing the elastomer sleeve of FIG. 5.

With reference also to FIGS. 5 and 6, elastomer sleeve 52a further includes an axially inwardly projecting major lip 96a that extends under compression to a valve centerline 98. Multiple angularly spaced cavities 100a extend radially inward from recess 76a of elastomer sleeve 52a. For example, an 8 inch (20 cm) valve 10 includes 24 cavities 100a that are angularly distributed uniformly around sleeve 52a and are canted axially inwardly. The number and size of cavities 100a relates to the volume of sleeve 52a displaced by gate 16 in the closed position.

Major lips 96a and 96b of respective sleeves 52a (FIG. 4B) and 52b compress against peripheral margins 102a and 102b (FIG. 4B) on opposite sides of gate 16 whenever it occludes passageway 20. In the absence of gate 16, major lips 96a and 96b engage each other to seal passageway 20 from atmosphere. Support faces 60a and 60b are spaced apart from respective peripheral margins 102a and 102b to support gate 16 and prevent it when under pressure on one side from over-compressing the downstream one of elastomer sleeves 52a and 52b. As a result, leakage around the corresponding upstream one of seal units 50a and 50b is reduced and the durability of elastomer sleeves 52a and 52b is enhanced.

Cavities 100a and 100b facilitate displacement of elastomer sleeves 52a and 52b when they engage gate 16 to allow easy flexure of sleeves 52a and 52b, thereby providing easier operation of valve 10 and improved durability for seal units 50a and 50b. Retaining rings 78a and 78b function to improve the coupling between elastomer sleeves 52a and 52b and hubs 54a and 54b, respectively. The combination of molding retaining rings 78a and 78b into respective rim segments 80a and 80b and holding them in place against hubs 54a and 54b minimize the tendency of sleeves 52a and 52b to pull from hubs 54a and 54b. This prevents misalignment of and damage to sleeves 52a and 52b.

Preferred valve 10 also includes grease point 106 allows grease to be introduced into a grease chamber 108 for lubricating elastomer sleeves 52a and 52b to prolong sleeve life and facilitate ease of operation. A hard wiper 110 together with conventional packing material is positioned within upper portion 36 and functions to seal grease within chamber 108. Wiper 110 also scrapes material from gate 16 as it slides through wiper 110. Wiper 110 may be formed of various materials according to the temperature and chemical characteristics of the slurry, such as polyethylene available as UHMW TM from Hoeshst Celanese of Chatham, N.J., Teflon TM (i.e., fluorinated ethylene propylene) available from Dupont, or of stainless steel of types 304 or 316. A clean-out area 112 is connected to a drip pan 114 that collects any fluid that might incidentally leak between gate 16 and seal units 50a and 50b.

It will be obvious to those having skill in the art that many changes may be made in the above-described details of a preferred embodiment of the present invention without departing from the underlying principles thereof. The scope of the invention should, therefore, be determined only by the following claims.

We claim:

1. A gate valve having a main body structure with first and second sides to which respective first and second conduits are attachable and an opening that defines a passageway along an axis between the conduits, comprising:

a gate that is positionable to occlude the passageway and that extends from the main body structure in a direction that is transverse to the first and second conduits, the gate having opposing sides that each have a peripheral margin;

moving means coupled to the gate for moving it along the axis to selectively occlude the passageway; and first and second annular seal members attachable to the main body structure within the passageway on opposite sides of the gate to engage its peripheral margins, the first and second seal members including first and second rigid mounting hubs to which respective first and second annular elastomer sleeves are attached, each elastomer sleeve having a continuous lip section and plural angularly spaced cavities, the lip sections of the first and second sleeves engaging the peripheral margins of the gate when it occludes the passageway and engaging each other otherwise, the first and second mounting hubs including axially outward radial flanges that extend along the respective first and second sides of the main body structure, whereby the plural cavities facilitate displacement of the elastomer sleeves when they engage the gate and the axially outward radial flanges of the mounting hubs function to prevent overcompression of the elastomer sleeves by attachment of the first and second conduits to the main body structure.

2. The valve of claim 1 in which each mounting hub includes a radially inwardly projecting ridge facing the passageway and having opposed faces, and the sleeve mounted to the mounting hub includes a pair of rims that engage the opposed faces of the ridge.

3. The valve of claim 2 in which each sleeve includes a rigid ring molded within one of the pair of rims.

4. The valve of claim 3 in which the rigid ring is molded within the rim positioned adjacent the lip section of each sleeve.

5. The valve of claim 1 in which each sleeve includes a rim that engages the mounting hub and a rigid ring that is molded within the rim, the rigid ring holding the sleeve in a fixed relation to the mounting hub.

6. The valve of claim 1 in which the first and second annular seal members are substantially identical.

7. The valve of claim i in which the plural cavities in the elastomer sleeves are canted axially inwardly toward the gate.

8. The valve of claim 1 in which the first and second mounting hubs include facing edges that are spaced apart to engage a peripheral margin of the gate when it occludes the passageway and is under pressure on one side, thereby to prevent undercompression of the elastomer sleeve on that side.

9. The valve of claim 1 in which each elastomer sleeve includes an axially outwardly projecting ridge that projects axially outwardly of the flange on the corresponding hub to form a gasket between the main body structure and the adjacent conduit.

10. The valve of claim I in which the main body structure includes first and second face-to-face body halves that are substantially identical.

11. The gate valve of claim 1 in which the first and second annular seal members are formed with rotational symmetry.

12. The gate valve of claim 1 constructed to be of a bidirectional type.

13. In a gate valve having a main body structure with first and second sides to which respective first and second conduits are attachable, an opening that defines a passageway along an axis between the conduits, and a gate that is positionable to occlude the passageway and that extends from the main body structure in a direction that is transverse to the first and second conduits, the gate having opposing sides that each have a peripheral margin, the improvement comprising:

first and second annular seal members attachable to the main body structure within the passageway on opposite sides of the gate to engage its peripheral margins, the first and second seal members including first and second rigid mounting hubs to which respective first and second annular elastomer sleeves are mounted, each elastomer sleeve having a continuous lip section for engaging the peripheral margin of the gate when it occludes the passageway and engaging each other otherwise, the first and second mounting hubs including axially outward radial flanges that extend along the respective first and second sides of the main body structure, whereby the axially outward radial flanges of the mounting hubs function to prevent overcompression of the elastomer sleeves by attachment of the first and second conduits to the main body structure.

14. The valve of claim 13 in which each elastomer sleeve includes plural angularly spaced cavities for facilitating displacement of the elastomer sleeves when they engage the gate.

15. The valve of claim 14 in which the plural cavities in the elastomer sleeves are canted axially inwardly toward the gate.

16. The valve of claim 13 in which the first and second mounting hubs include facing edges that are spaced apart to engage a peripheral margin of the gate when it occludes the passageway and is under pressure on one side, thereby to prevent undercompression of the elastomer sleeve on that side.

17. The valve of claim 16 in which each elastomer sleeve includes an axially outwardly projecting ridge that projects axially outwardly of the flange on the corresponding hub to form a gasket between the main body structure and the adjacent conduit.

18. The valve of claim 13 in which each mounting hub includes a radially inwardly projecting ridge facing the passageway and having opposed faces, and the sleeve mounted to mounting hub includes a pair of rims that engage the opposed faces of the ridge.

19. The valve of claim 18 in which each sleeve includes a rigid ring molded within one of the pair of rims.

20. The valve of claim 13 in which each sleeve includes a rim that engages the mounting hub and a rigid ring that is molded within the rim, the rigid ring holding the sleeve in a fixed relation to the mounting hub.

21. The valve of claim 13 in which the first and second annular seal members are substantially identical.

22. The valve of claim 13 in which the main body structure includes first and second face-to-face body halves that are substantially identical.

23. The gate valve of claim 13 in which the first and second annular seal members are formed with rotational symmetry.

24. The gate valve of claim 13 constructed to be of a bidirectional type.

* * * * *

UNITED STATES PATENT AND TRADEMARK OFFICE
CERTIFICATE OF CORRECTION

PATENT NO. : 5,338,006
DATED : August 16, 1994
INVENTOR(S) : Andrew J. McCutcheon, Jeffrey M. Bowman and David L. Gambetta It is certified that error appears in the above-indentified patent and that said Letters Patent is hereby corrected as shown below:

Column 1, line 14, after "pair" insert --of--

Column 3, line 47, change "Teflon ½" to --Teflon™--

Column 6, line 19, change "claim i" to --claim 1--

Column 6, line 34, change "claim I" to --claim 1--

Signed and Sealed this

Thirty-first Day of January, 1995

Attest:

BRUCE LEHMAN

*Attesting Officer*     *Commissioner of Patents and Trademarks*